June 9, 1959  H. DE LANG  2,889,734
DICHROIC CROSS-MIRROR OPTICAL SYSTEM
Filed Feb. 11, 1957
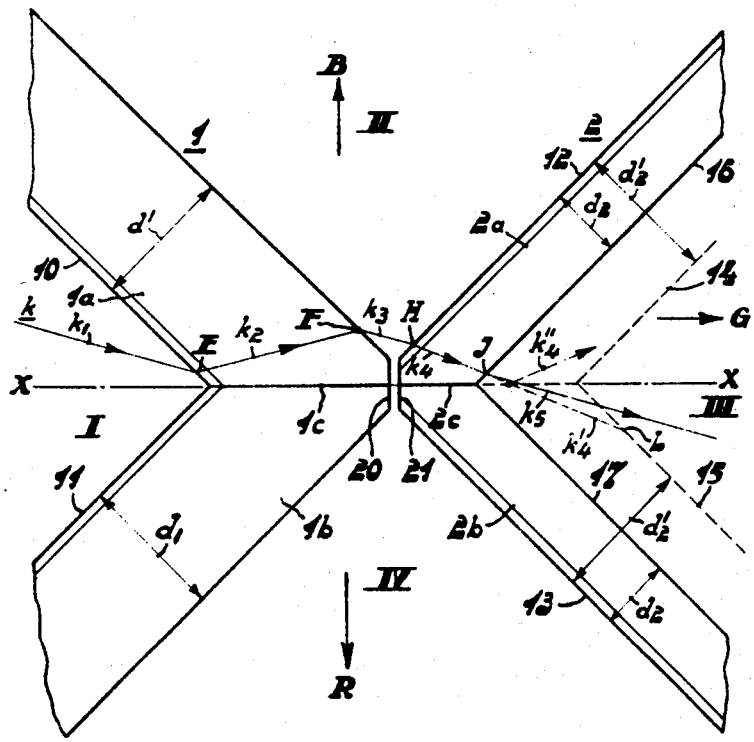
INVENTOR
HENDRIK DE LANG

2,889,734

DICHROIC CROSS-MIRROR OPTICAL SYSTEM

Hendrik de Lang, Eindhoven, Netherlands, assignor, by mesne assignments, to North American Philips Company, Inc., New York, N.Y., a corporation of Delaware Application February 11, 1957, Serial No. 639,498

Claims priority, application Netherlands February 29, 1956

3 Claims. (Cl. 88—1)

The present invention relates to a dichroic cross-mirror optical system.

Optical systems having dichroic cross-mirror systems are known. They are used, for example, for subdividing light into three basic colors, or conversely for combining three basic colors. Cross-mirror systems of known type have the disadvantage that the area at which the mirror is interrupted results in a shade effect.

The object of the present invention is to mitigate said disadvantage. For this purpose, in accordance with the present invention the dichroic cross-mirror optical system comprises plate-shaped mirrors for the layers reflecting in a spectral-selective manner, said mirrors constituting two V-shaped bodies having their apices adjacent one another, the thickness of the mirrors of the V-shaped body adjacent the non-divided light being greater than the thickness of the mirrors of the V-shaped body remote from the non-divided light. If the angle made by the mirror limbs of each V-shaped body is approximately 90°, the mirrors of the V-shaped body adjacent the non-divided light is preferably given a thickness at least about twice the thickness of the mirrors of the V-shaped body remote from the non-divided light.

In order that the invention may be readily carried into effect, it will now be described with reference to the accompanying drawing, wherein the single figure is a cross-section of an embodiment of a dichroic cross-mirror system along the axis X—X of the optical system of the present invention.

On the left-hand side of the figure, there is shown a sector I, in which the light is non-divided. In sectors II, III and IV the light is subdivided.

The cross-mirror system comprises two V-shaped bodies 1 and 2. These V-shaped bodies have their apices, which in this example are flattened, adjacent one another. The surfaces 10, 11, 12, 13 of the bodies 1 and 2 are mirror layers reflecting in a spectral-selective manner. Assuming that the spectral portions, into which the cross-mirror system subdivides white light O, are the spectral regions green, red and blue (G, R, B) and if the layers 10 and 13 reflect red light, but are permeable to blue and green light, whereas the layers 11 and 12 reflect blue light, but are permeable to green and red light, then if white light O, which hence is non-divided, impinges from the section I upon the cross-mirror system shown, this light is subdivided into blue light B, which substantially enters the sector II, into green light G, which enters the sector III, and into red light R, which enters the sector IV. This effect is known, as such, and needs no further explanation.

If, as is common practice, the cross-mirror system is built up from two V-shaped bodies having the same thickness ($d_1 = d'_2$), troublesome shadow bands result in practice, which occur only in the light passing in a straight line and hence in the light of the green basic color in the example shown.

This disadvantage is illustrated in the figure with reference to a light-ray $k$. The non-divided light-ray $k_1$ reaches at point E the surface 10 of the body 1. There the red spectral portion R is reflected (not shown in the figure). The remaining green and blue spectral portions pass in the direction $k_2$ through the mirror portion 1a of the V-shaped body 1. The direction $k_2$ is slightly directed away from the axis X—X. At point F, the light-ray $k_2$ leaves the mirror 1a of the body 1 to be refracted slightly in the direction $k_3$ towards the axis X—X. When the light-ray has reached the body 2 at point H, the blue spectral portion B of the light is reflected in a manner not shown due to the presence of layer 12, so that at point H only the green spectral portion in the direction $k_4$, which is directed more toward the axis X—X, occurs in mirror 2a of the V-shaped body 2. This light-ray would propagate in the mirror 2a of the body 2 until it reaches point L; the portion $k'_4$ of this light-ray as shown in dotted lines is located in line with the direction $k_4$. At point L, and hence where the light-ray reaches the dotted second boundary surface of the V-shaped body 2 having a thickness $d'_2 = d_1$, said light ray is totally reflected by the surface 15 and hence is lost as useful light. Of the non-divided light-ray $k$, only the components in the basic colors blue and red thus show to full advantage, a shade effect occurring in the green sector.

If, however, the thickness $d_2$ of the mirrors of the body 2 is less than that of the mirrors of the body 1, for example half thereof, so that the boundary surfaces of the body 2 which are remote from the non-divided light lie at the areas of the full lines 16 and 17, said disadvantage may largely be eliminated. The light-ray $k_4$, upon reaching the surface 16 of the mirror 2a of the body 2, can at point J without any objection emerge from the material of said body to enter the sector III in the direction $k_5$ and hence in this case is not lost as a green color component.

The jump effect resulting from the relatively different thicknesses of the V-shaped bodies is not objectionable at all, if the cross-mirror system is used in an optical system, in which a color image is scanned by a white light beam and the transmitted light is subdivided into the specified colors and the divided light is received on photoelectric cells, since the geometric configuration of an image produced on the photoelectric layer of a photocell is unimportant.

If the cross-mirror system according to the invention is to be used in an optical system for projection purposes, it is necessary to take the jump effect into account, for example by providing a telecentric path of rays.

In the embodiment shown, the V-shaped bodies 1 and 2 are each subdivided into two mirror parts 1a and 1b, and 2a and 2b, respectively, which adjoin along separation surfaces 1c and 2c, respectively.

In the description of the path of the light-ray $k'_4$, the presence of the separation surface 2c between the mirror parts 2a and 2b of the body 2 has not been taken into account. If such a separation surface were present, the light-ray $k'_4$, shown in dotted lines, due to the presence of said separation surface, would be directed wholly or in part in the direction $k''_4$ and in this case would also be lost as useful light.

In the embodiment shown, the apices of the two V-shaped bodies are facetted at their surfaces 20 and 21; these surfaces are slightly spaced apart in the example. It will be evident that the invention is also applicable if the facetted surfaces are absent and/or if the bodies 1 and 2 adjoin at their apices through a larger or smaller surface without any spacing.

While the invention has been described by means of a specific example and in a specific embodiment, I do not wish to be limited thereto, for obvious modifications will occur to those skilled in the art without departing from the spirit and scope of the invention.

What is claimed is:

1. A dichroic cross-mirror optical system comprising a pair of mirror arrangements for spectral-selective reflection of light, each of said mirror arrangements comprising a pair of mirror portions positioned to form a substantially V-shape with each other, the mirror portions of a first of said mirror arrangements being substantially equal in thickness to each other and having substantially greater thickness than those of the second of said mirror arrangements, said pair of mirror arrangements being positioned with their apexes substantially adjacent each other in confronting relationship, and means for deriving monochromatic light rays from the outer surfaces of the mirror portions of said first of said mirror arrangements and from the inner surfaces of the mirror portions of said second of said mirror arrangements upon multichromatic light rays being applied to the outer surfaces of the mirror portions of said first of said mirror arrangements, said last-mentioned means comprising dichroic color selective layers on said last-mentioned surfaces.

2. A dichroic cross-mirror optical system comprising a pair of mirror arrangements for spectral-selective reflection of light, each of said mirror arrangements comprising a pair of mirror portions positioned to form a substantially 90 degree V-shape with each other, the mirror portions of a first of said mirror arrangements being substantially equal in thickness to each other and having substantially twice the thickness of those of the second of said mirror arrangements, said pair of mirror arrangements being positioned with their apexes substantially adjacent each other in confronting relationship, and means for deriving monochromatic light rays from the outer surfaces of the mirror portions of said first of said mirror arrangements and from the inner surfaces of the mirror portions of said second of said mirror arrangements upon multichromatic light rays being applied to the outer surfaces of the mirror portions of said first of said mirror arrangements, said last-mentioned means comprising dichroic color selective layers on said last-mentioned surfaces.

3. A dichroic cross-mirror optical system comprising a pair of mirror arrangements for spectral-selective reflection of light, each of said mirror arrangements comprising a pair of mirror portions positioned to form a substantially 90 degree V-shape with each other, the mirror portions of a first of said mirror arrangements being substantially equal in thickness to each other and having at least twice the thickness of those of the second of said mirror arrangements, said pair of mirror arrangements being positioned with their apexes substantially adjacent each other in confronting relationship, and means for deriving monochromatic light rays from the outer surfaces of the mirror portions of said first of said mirror arrangements and from the inner surfaces of the mirror portions of said second of said mirror arrangements upon multichromatic light rays being applied to the outer surfaces of the mirror portions of said first of said mirror arrangements, said last-mentioned means comprising dichloric color selective layers on said last-mentioned surfaces.

References Cited in the file of this patent

UNITED STATES PATENTS

| | | |
|---|---|---|
| 1,299,431 | Dawson | Apr. 8, 1919 |
| 2,604,808 | Sachtleben | July 29, 1952 |
| 2,642,487 | Schroeder | June 16, 1953 |
| 2,672,072 | Sachtleben et al. | Mar. 16, 1954 |